United States Patent

Nishizaki et al.

[11] Patent Number: 5,950,938
[45] Date of Patent: Sep. 14, 1999

[54] METHOD AND APPARATUS FOR TREATMENT OF HAY BEFORE DRIED ON SPOT

[75] Inventors: Kunio Nishizaki; Yoichi Shibata; Yasuhiro Yokochi, all of Hokkaido; Yuji Nakayama, Mie, all of Japan

[73] Assignees: Director General of Hokkaido National Agricultural Experiment Station, Hokkaido; Takakita Co., Ltd, Mie, both of Japan

[21] Appl. No.: 09/086,712

[22] Filed: May 29, 1998

[30] Foreign Application Priority Data

Aug. 11, 1997 [JP] Japan .................................. 9-228818

[51] Int. Cl.⁶ ........................... B02C 19/00; B02C 19/12
[52] U.S. Cl. ...................... 241/28; 241/30; 241/101.742; 241/101.763; 241/159; 241/605; 100/70 A; 56/16.4 B
[58] Field of Search ........................... 241/101.7, 101.76, 241/101.763, 28, 30, 605, 159, 101.77, 101.742; 56/14.4, 16.4 A, 16.4 B, 16.4 C, DIG. 1; 100/70 A, 158 R, 161, 176

[56] References Cited

U.S. PATENT DOCUMENTS

| | | | |
|---|---|---|---|
| 2,521,199 | 9/1950 | Scott | 241/101.763 |
| 3,240,148 | 3/1966 | Varga | 100/158 R |
| 3,517,490 | 6/1970 | Matthews | 56/18 |
| 4,265,076 | 5/1981 | Krutz | 56/14.4 |
| 4,332,125 | 6/1982 | Holdren | 56/1 |
| 4,407,114 | 10/1983 | Zweegers | 56/344 |
| 4,446,678 | 5/1984 | Smith | 56/1 |
| 4,546,599 | 10/1985 | Cicci et al. | 56/16.4 |
| 5,152,127 | 10/1992 | Koegel et al. | 56/14.1 |
| 5,167,757 | 12/1992 | Didelot | 156/852 |
| 5,354,003 | 10/1994 | Stokes | 241/101.7 |
| 5,366,169 | 11/1994 | Willibald | 241/101.7 |
| 5,379,580 | 1/1995 | Gropp et al. | 56/16.4 B |
| 5,546,736 | 8/1996 | Allworden | 56/192 |

*Primary Examiner*—Joseph J. Hail, III
*Assistant Examiner*—Dermott J Cooke
*Attorney, Agent, or Firm*—Browdy & Neimark

[57] ABSTRACT

A fixed roller is laterally axially supported by a movable body so as to allow an axial center line of the fixed roller to extend in parallel to a lateral direction, and driven to rotate an upper peripheral surface of the fixed roller backward, and a plurality of split press rollers respectively having the axes inclined by a predetermined angle with respect to an axial center line of the fixed roller as viewed in plan are arranged in a row in a lateral direction above the fixed roller in the manner of supporting the split press rollers by press roller frames. The split press rollers are energized to the descending side by oil-hydraulic cylinders respectively provided between a frame of the body and the press roller frames so as to bring the lower peripheral surface side of each split press roller into contact with the upper peripheral surface of the fixed roller under the action of pressure.

5 Claims, 4 Drawing Sheets

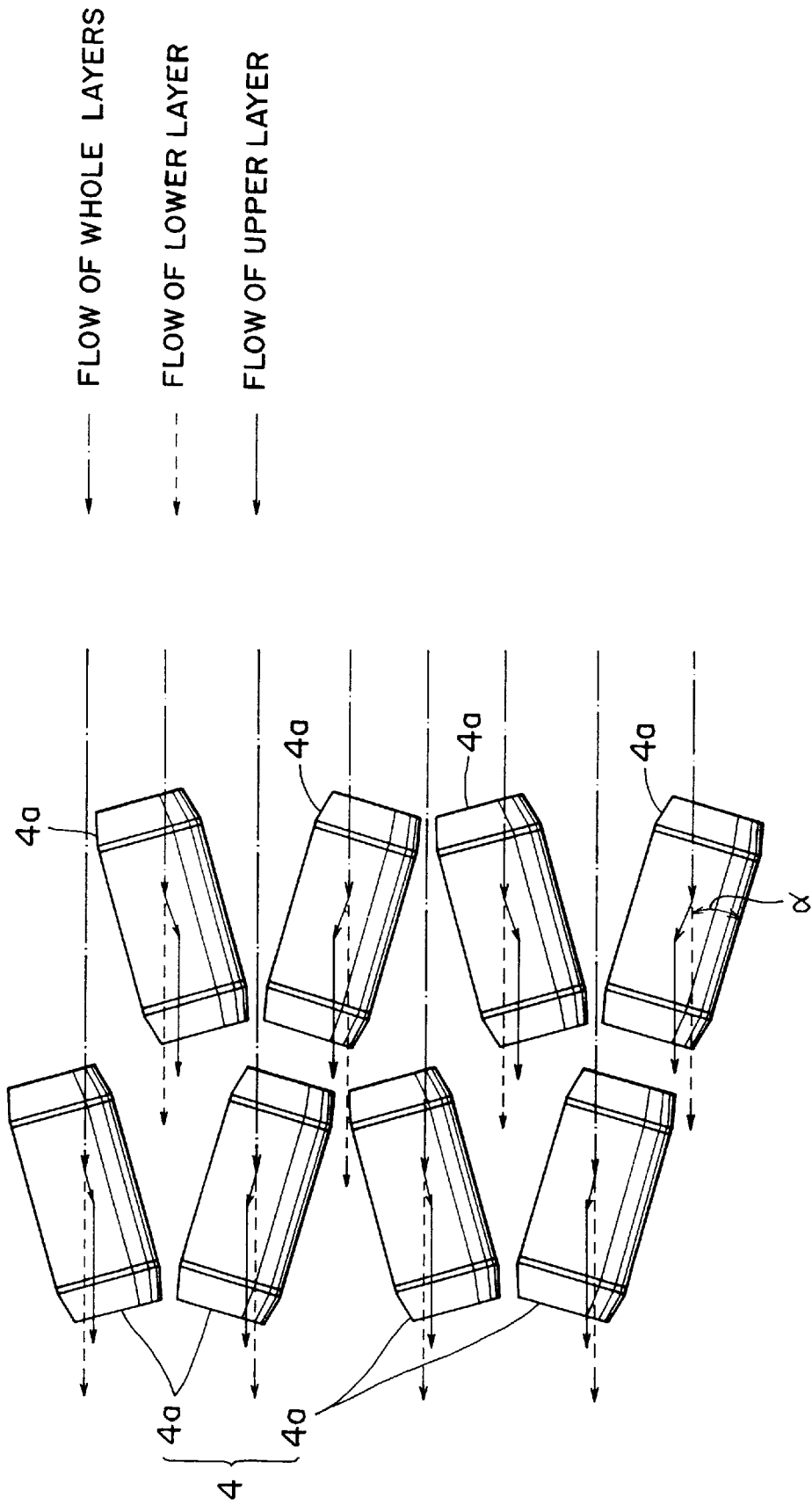

METHOD AND APPARATUS FOR TREATMENT OF HAY BEFORE DRIED ON SPOT

BACKGROUND OF THE INVENTION

1. Field of the Invention

This invention relates to a method and apparatus for treatment of hay before dried on the spot, and more particularly, to a method and apparatus which increase a drying rate of mowed-down hay so as to enable rapid drying of hay on the spot, when vegetating hay in the field is mowed by a mower of mow-down type in the manner of mowing down the hay on the field or that of rake-up type in the manner of raking up the hay in windrow, and then allowed to stand as it is for drying on the spot.

2. Description of the Prior Art

When vegetating hay in the field is mowed by a mower and then prepared for the forage of domestic animals, it is necessary to dry the hay so as to reduce the moisture content of hay more than that of just mowed hay, in case of using the hay for not only dried hay but also silage.

Thus, for the purpose of increasing a drying rate of mowed hay, the mowed hay is mixed by stirring or whipped for rapid drying.

When the hay mowed down on the field by the mower is mixed by stirring or whipped for rapid drying, especially, when forage legume hay, there is a problem in that a pick-up device picks up the hay having been dried in a predetermined manner, leaving highly-nourishing leaves on the field, resulting in remarkable increase of a pick-up loss.

This is based on the fact that the forage legume has the properties of having hard stalks which are hardly dried and contain less nourishment, and soft leaves which are easily dried and contain much nourishment, so that when the forage legume is mixed by stirring or whipped as described above for rapid drying, highly-nourishing leaves are stripped from the stalks in the course of the above operation and then fall off to the ground, and as a result, the pick-up device generally used for a conventional hay harvesting machine could not pick up such highly-nourishing leaves.

SUMMARY OF THE INVENTION

An object of the present invention is to provide a novel means which macerates the cell membrane of hay by the application of physical pressure without whipping or mixing by stirring the hay, while brings the hard stalks into contact with the soft leaves under the action of pressure so as to evaporate the water content in the stalks through the leaves, and places the pressurized hay continuously in the form of a mat on the stubble to enable drying of the hay also by air from below the hay.

According to the present invention, as means to attain the above object, there is provided a method for treatment of hay before dried on the spot. This method comprises the steps of feeding the hay having been mowed down on the field or having been mowed and raked up in windrow into a macerater composed of a fixed roller supported in fixed position by a movable body, and a multiple split press roller composed of a plurality of axially split press rollers, which are arranged above the fixed roller individually movably upward and downward in the manner of inclining an axial center line of each split press roller with respect to an axial center line of the fixed roller as viewed in plan, and energized to the descending side, then macerating the hay into pieces placed in the form of a mat, and then allowing the macerated hay to stand as it is on the field for drying on the spot. There is also provided an apparatus for treatment of hay before dried on the spot, wherein a fixed roller is laterally axially supported by a movable body so as to allow an axial center line of the fixed roller to extend in parallel to a lateral direction, and driven to rotate an upper peripheral surface of the fixed roller backward, and a plurality of split press rollers respectively having the axes inclined by a predetermined angle with respect to an axial center line of the fixed roller as viewed in plan are arranged in a row in a lateral direction above the fixed roller in the manner of respectively supporting the split press rollers by press roller frames, and energized to the descending side by oil-hydraulic cylinders respectively provided between the press roller frames and a frame of the body so as to bring the lower peripheral surface side of each split press roller into contact with the upper peripheral surface of the fixed roller under the action of pressure. Further, there is provided an apparatus for treatment of hay before dried on the spot, wherein a fixed roller is laterally axially supported by a movable body so as to allow an axial center line of the fixed roller to extend in parallel to a lateral direction, and driven to rotate an upper peripheral surface of the fixed roller backward, and a plurality of split press rollers respectively having the axes inclined by a predetermined angle with respect to an axial center line of the fixed roller as viewed in plan are arranged in a row in a lateral direction above the fixed roller in the manner of respectively supporting the split press rollers by press roller frames so as to change the direction of axial center lines of the split press rollers alternately to the right and to the left in the order of arrangement of the split press rollers in a row, and energized to the descending side by oil-hydraulic cylinders respectively provided between the press roller frames and a frame of the body so as to bring the lower peripheral surface side of each split press roller into contact with the upper peripheral surface of the fixed roller under the action of pressure. Furthermore, there is provided an apparatus for treatment of hay before dried on the spot, wherein a plurality of maceraters, each of which is composed of a fixed roller laterally axially supported by a movable body so as to allow an axial center line of the fixed roller to extend in parallel to a lateral direction, and driven to rotate an upper peripheral surface of the fixed roller backward, and a plurality of split press rollers arranged in a row in a lateral direction above the fixed roller in the manner of inclining an axis of each split press roller by a predetermined angle with respect to an axial center line of the fixed roller as viewed in plan, and energized to the descending side by oil-hydraulic cylinders so as to bring the lower peripheral surface side of each split press roller into contact with the upper peripheral surface of the fixed roller under the action of pressure, are installed in a movable body and arranged longitudinally in a row, and the split press rollers arranged in a row in the maceraters are placed such as to be longitudinally deviated from each other by a pitch corresponding to one split press roller.

According to the means of the present invention, the fixed roller rotated by a lateral shaft orthogonal to the travel direction of a self-traveling body or a body drawn by a tractive vehicle such as a tractor for traveling is axially supported by a frame of the body in fixed position with respect to the body, and the press roller is arranged above the fixed roller and supported by the body movably upward and downward so that the press roller comes closer to or becomes distant from the fixed roller. Further, the press roller is freely ascended and descended by a lift device such as an oil-hydraulic cylinder.

The press roller is energized to the descending side under the action of oil-hydraulic pressure applied to the oil hydraulic cylinder or spring load so as to bring the lower peripheral surface side of the press roller into contact with the upper peripheral surface of the fixed roller under the action of pressure.

The press roller and the fixed roller are driven to rotate the contact surface between the press roller and the fixed roller backward in the travel direction of the body. However, one of the rollers may be driven to drive the other for rotation under the action of contact pressure.

Further, a pick-up device to pick up the hay is arranged on the front surface side of these rollers and supported by the body. A guide/convey device is provided between the pick-up device and the fixed roller and the press roller so as to convey and guide the picked-up hay toward a portion between these rollers brought into contact with each other under the action of pressure.

The press roller is brought into contact with the fixed roller under the action of oil-hydraulic pressure applied to the oil hydraulic cylinder by connecting an accumulator to an oil-hydraulic circuit of the oil-hydraulic cylinder, so that the press roller is adapted to be brought into contact with the peripheral surface of the fixed roller under the action of fixed pressure determined in the oil-hydraulic circuit, even though the amount of hay picked up by the pick-up device and then conveyed to the portion between the press roller and the fixed roller brought into contact with each other under the action of pressure is varied.

Further, the press roller is composed of a plurality of axially split press rollers which are arranged in a row in an axial direction and supported at positions opposed to the fixed roller, and at this time, the split press rollers arranged in a row are paired off. Each pair of split press rollers are axially supported by the press roller frames with an inclination to an axial center line of the fixed roller such that axial center lines of the pair of split press rollers become distant from each other in the front and come closer to each other in the rear as viewed in plan. These press roller frames are supported by the body frame such that the split press rollers are energized to the descending side by the oil-hydraulic cylinders and freely moved upward and downward, and therefore, the action of grinding down the stalks of the hay in the lateral direction along the peripheral surface of the fixed roller is accomplished by the pair of split press rollers, in addition to the action of macerating the hay between the split press rollers and the fixed roller, resulting in more effective macerating of the hay. Incidentally, in macerating, the split press rollers and the fixed roller compress the hay to such a degree that the forage legume produces sap. In this case, the pressure for compression is about in the range of 300 to 500 $N/cm^2$.

BRIEF DESCRIPTION OF THE DRAWINGS

The foregoing and other objects and features of the invention will become apparent from the following description of preferred embodiments of the invention with reference to the accompanying drawings, in which:

FIG. 3 is a view for explaining operation of split press rollers arranged in a row in the apparatus of FIG. 1;

PREFERRED EMBODIMENTS OF THE INVENTION

Figure 1:
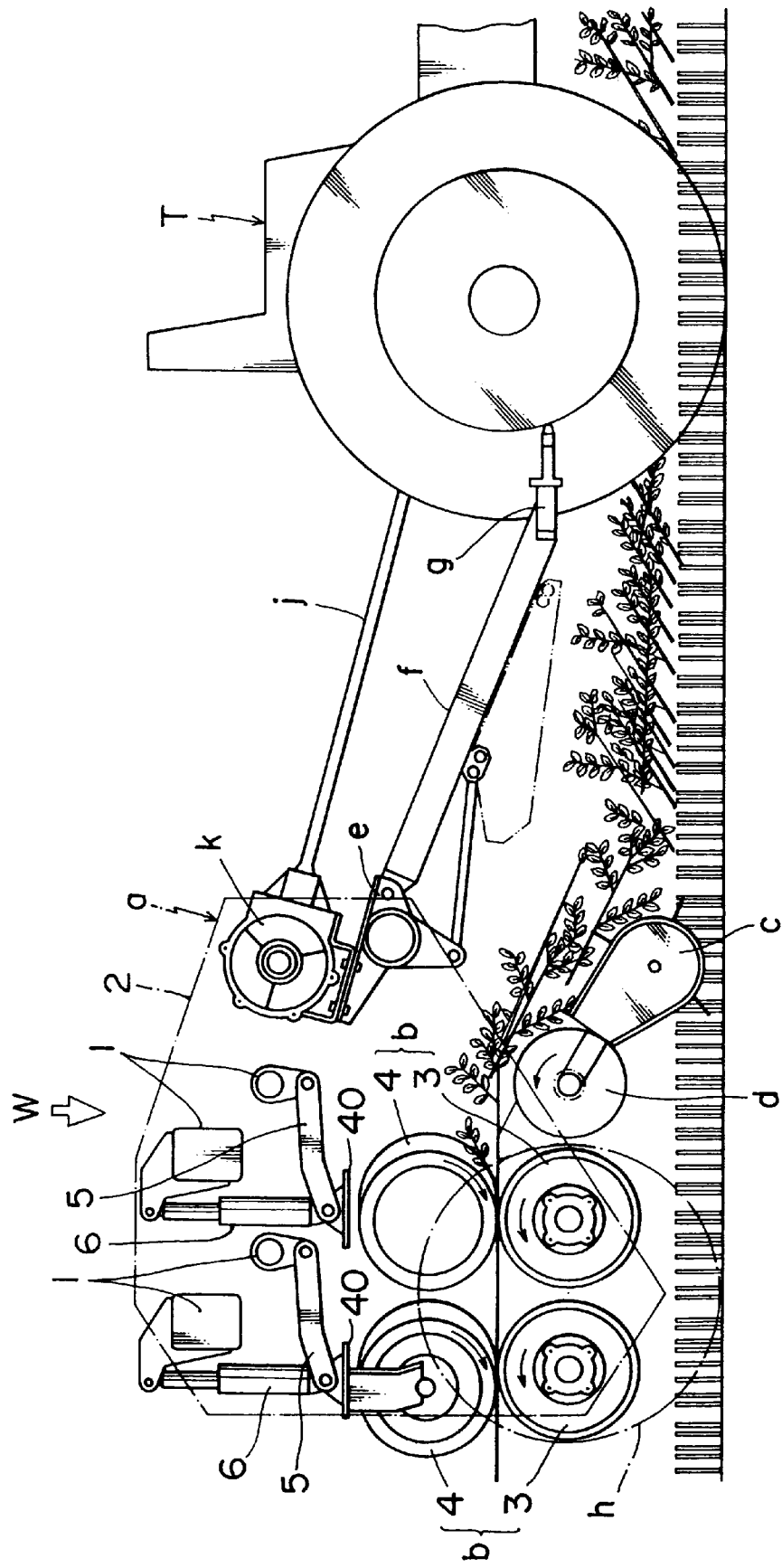
FIG. 1 is a longitudinal side view showing an apparatus for treatment of hay before dried on the spot according to the present invention when operated.

FIG. 1 is a longitudinal side view showing an apparatus for treatment of hay before dried on the spot according to one embodiment of the present invention when the apparatus is connected to a tractor so as to draw the apparatus. In FIG. 1, reference symbol T denotes a tractor, W is an apparatus for treatment of hay before dried on the spot, a is a frame body of the apparatus W, and b is a macerater installed in the body a, while reference numerals 1 . . . denote frames of the body a, 2 . . . are side plates provided on both sides of the frames 1 . . . , 3 . . . are fixed rollers included in the macerater b and axially supported in fixed position by the body a, and 4 . . . are press rollers included in the macerater b and axially supported by the body a movably upward and downward at positions opposed to the fixed rollers 3 . . . .

The apparatus W is of a type, which picks up and then macerates the hay having been mowed down on the field using a mower of mow-down type. In the apparatus W, a pick-up device c to pick up the hay having been mowed down on the field and a guide device d to guide the picked-up hay toward a macerating portion of the macerater b are provided on the front surface side of the body a equipped with the macerater b.

The apparatus W is also of a drawn type, which travels by connecting the body a to the rear surface side of a vehicle body of the tractor T so as to draw the body a. The body a is connected to the tractor T by connecting a connector e mounted on the top of a front end of the body a to a hitch g provided on the rear surface of the vehicle body of the tractor T through a drawbar f, and travel wheels h . . . are axially supported by lower portions on the left and right sides of the body a. Further, a transmission k to transmit power through a PTO shaft (not shown) and a universal joint j provided on the rear surface of the vehicle body of the tractor T is provided above the connector e at the front end of the body a, so that power of rotations is adapted to be transmitted from the transmission k to the macerater b, the pick-up device c and the guide device d or the like.

Figure 2:
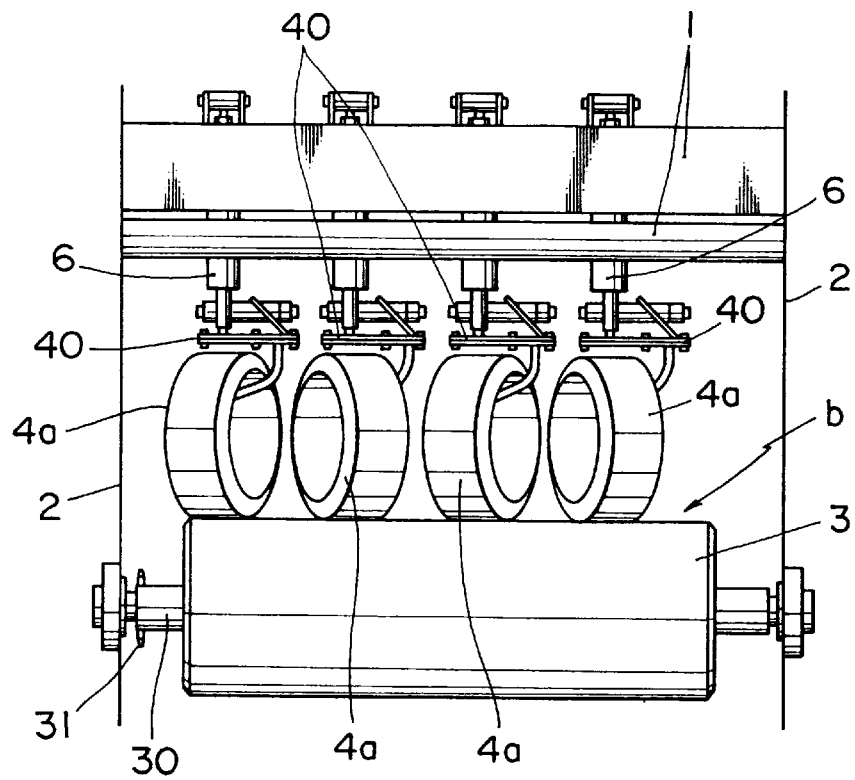
FIG. 2 is a longitudinal front view showing the apparatus of FIG. 1.

The macerater b comprises the fixed roller 3 laterally axially supported in fixed position by the body a so as to allow an axis of the fixed roller to extend in parallel to a lateral direction, and the press roller 4 arranged above the fixed roller 3 vertically in parallel thereto, axially supported by the body a movably upward and downward and energized to the descending side so as to bring the lower peripheral surface side of the press roller into contact with an upper peripheral surface of the fixed roller 3 under the action of pressure. The fixed roller 3 of the macerater is adapted to rotate the upper peripheral surface of the fixed roller backward (i.e., clockwise in FIG. 1) by driving a transmission chain (not shown) wound around a sprocket 31 (See FIG. 2) provided on a shaft 30 with power from the transmission k. There are two fixed rollers arranged longitudinally in a row The press roller 4 arranged above the fixed roller 3 vertically in parallel thereto and axially supported by the body a movably upward and downward is composed of a plurality of axially split press rollers 4a . . . , which are axially arranged in a row, as shown in FIG. 2.

These split press rollers 4a . . . are axially supported by press roller frames 40 . . . and individually supported by the frame 1 of the body a through link mechanisms 5 . . . movably upward and downward every press roller frame 40.

Further, these split press rollers 4a are individually energized (or, forced) to the descending side by oil-hydraulic cylinders 6 provided between the frame 1 and the press roller frames 40.

Further, each split press roller 4a is axially supported by the individual press roller frame 40 such that an axial center line of the rotary shaft is inclined by a predetermined angle with respect to an axial center line of the fixed roller 3 as viewed in plan (that is, the axes of the split press rollers 4a are skew to the axis of the fixed roller 3), and the direction of inclination of the axial center lines of the rotary shaft is changed alternately to the right and to the left in the order of arrangement of the split press rollers 4a in a row. Thus, the split press rollers 4a . . . are paired off into right and left press roller pairs such that the axial center lines of the split press rollers become distant from each other in the front and come closer to each other in the rear as viewed in plan. The paired-off split press rollers 4a, 4a are multiply arranged in a row in a lateral direction.

As shown in FIG. 3, there are two maceraters b each composed of the paired-off split press rollers 4a . . . arranged in a row and the fixed roller 3, and these maceraters are arranged in a longitudinal direction such that the split press rollers 4a . . . arranged in a row are deviated from each other by a portion corresponding to one split press roller 4a. Thus, as shown in FIG. 3, the macerating portions of the front and rear maceraters b, b are placed to be deviated from each other in the axial direction of the fixed roller 3.

Figure 4:
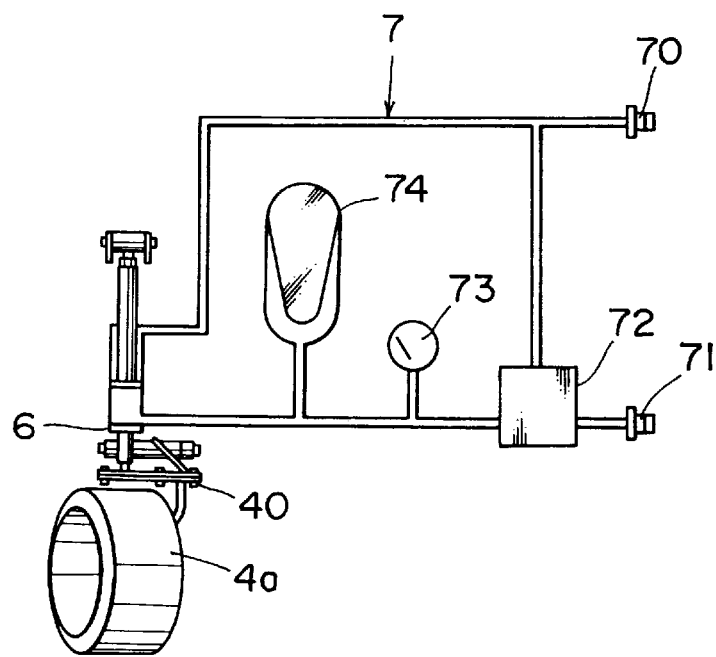
FIG. 4 is an oil-hydraulic circuit diagram showing an oil hydraulic cylinder for the split press rollers of the apparatus of FIG. 1.

As shown in FIG. 4, an oil-hydraulic circuit 7 connected to an oil-hydraulic device mounted on the vehicle body of the tractor T through couplers 70, 71 is connected to each of the oil-hydraulic cylinders 6 provided between the frame 1 of the body a and the press roller frames 40 of the split press rollers 4a . . . of the macerater b. A relief valve 72, a pressure gauge 73 and an accumulator 74 are connected to the oil-hydraulic circuit 7, so that even if a load applied to each split press roller 4a is varied, the split press rollers are adapted to be brought into contact with the fixed rollers 3 . . . under the action of fixed pressure predetermined by the relief valve 72.

Figure 5:
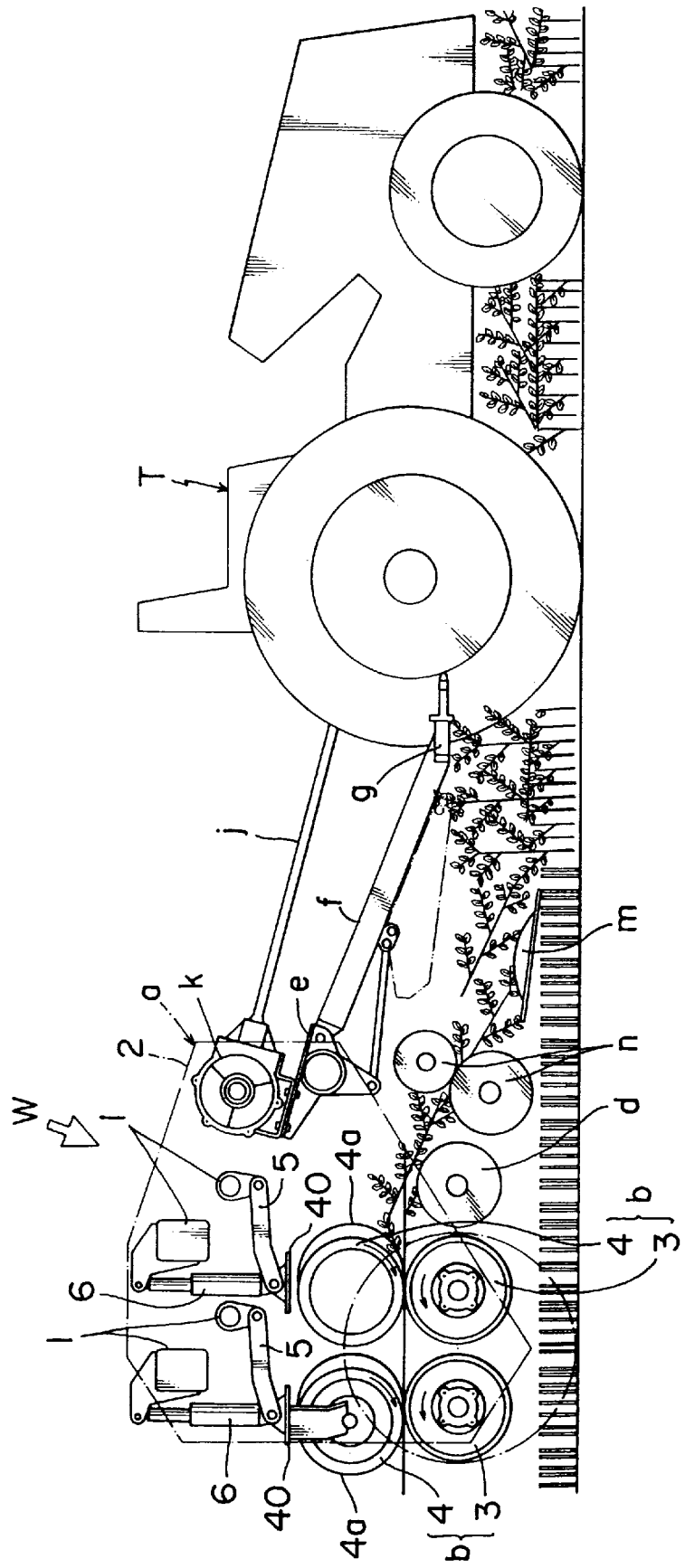
FIG. 5 is a longitudinal side view showing another embodiment of the apparatus of FIG. 1 when operated.

FIG. 5 shows another embodiment of the present invention. According to this embodiment, the apparatus is combined with a mower of rake-up type which rakes up the vegetating hay in the field, while mowing the hay. A mower m of rake-up type which rakes up the vegetating hay in the field in windrow while mowing the hay, a conveying device n composed of a pair of opposite feed rolls to convey the hay having been mowed and raked up by the mower to the rear, and the guide device d are arranged in this order in a row on the front surface of the body a. Thus, the apparatus of this embodiment is adapted to convey the hay having been mowed and raked up to the maceraters b, b installed in the body a for macerating, similarly to the above-mentioned embodiment.

Since the maceraters b, b installed in the body a, the transmission k for driving the maceraters, the connector e for connecting the body a to the vehicle body of the tractor T and the means for connecting the body a to the rear surface side of the vehicle body of the tractor T so as to draw the body are similar to those in the above-mentioned embodiment, like constituent members are given like reference symbols, and therefore, the detailed description thereof will be omitted.

As has been described in the foregoing, according to the present invention, when the vegetating hay in the field is mowed down or mowed and raked up in windrow, and then allowed to stand on the field for drying on the spot, the hay having been mowed down or having been mowed and raked up is macerated by feeding the hay into the macerater b composed of the fixed roller 3 axially supported in fixed position by the body a, and the multiple split press roller composed of a plurality of axially split press rollers, which are arranged above the fixed roller individually movably upward and downward in the manner of inclining the axial center line of each split press roller with respect to an axial center line of the fixed roller as viewed in plan, and energized to the descending side, and the macerated hay is subjected to drying on the spot. Thus, even if the hay to be dried includes forage legume having hard stalks and easily-stripped leaves, the multiple press rollers arranged in a row in the manner of inclining the axial center line of each split press roller by a predetermined angle with respect to the axial center line of the fixed roller 3 as viewed in plan grind down the hay in a lateral direction. Thus, the press rollers effectively grind down the hard stalks, and bring the leaves into contact with the stalks under the action of pressure, resulting in rapid drying of the hay. Further, when the hay is picked up after drying, it is possible to remarkably reduce a pick-up loss resulting from leaving highly-nourishing leaves on the field.

What is claimed is:

1. A method for treatment of mowed hay on a field comprising the steps of:

feeding the hay into a macerater comprising a frame body, a fixed roller supported in a fixed position on the body, and a multiple split press roller further including a plurality of axially split press rollers which are disposed above said fixed roller and are individually movably upward and downward and wherein an axial center line of each split press roller is inclined with respect to an axial center line of said fixed roller as viewed in plan;

energizing each split press roller downward;

macerating the hay into pieces placed in the form of a mat; and allowing the macerated hay to stand as it is on the field for drying.

2. An apparatus for treatment of hay comprising:

a frame body having a direction of motion;

a fixed roller axially supported by said body to allow an axial center line of the fixed roller to extend in parallel to a lateral direction, generally to the direction of motion, and driven to rotate an upper peripheral surface of the fixed roller opposite to the direction of motion;

a plurality of split press rollers respectively having axes thereof inclined by a predetermined angle with respect to the axial center line of said fixed roller as viewed in plan, and arranged in a row in the lateral direction above said fixed roller, said split press rollers being respectively supported by press roller frames; and oil hydraulic cylinders respectively provided between the frame body and said press roller frames to energize said split press rollers in a downward direction so as to bring a lower peripheral surface side of each split press roller into contact with an upper peripheral surface of said fixed roller under pressure.

3. The apparatus for treatment of hay according to claim 2, wherein the axes of the plurality of split press rollers change directions alternately to the left and to the right along a row of the split press rollers.

4. An apparatus for treatment of hay, comprising:

a frame body having a direction of motion;

a plurality of macerators arranged longitudinally in a row and installed in said body, each of said macerators including a fixed roller axially supported by said body to the direction of motion to allow an axial center line of the fixed roller to extend in parallel to a lateral direction, and driven to rotate an upper peripheral surface of the fixed roller opposite to the direction of motion, and a plurality of split press rollers arranged in a row in the lateral direction above said fixed rollers, wherein an axis of each split press roller is inclined by a predetermined angle with respect to the axial center line of said fixed roller as viewed in plan, and forced downward by oil-hydraulic cylinders so as to bring a lower peripheral surface side of each split press roller into contact with an upper peripheral surface of said fixed roller under pressure;

wherein the split press roller arranged in a row in said macerators are longitudinally deviated from each other by a pitch corresponding to one split press roller.

5. A method of treating mowed hay on a field, comprising:

providing a movable frame body;

providing a pair of rollers mounted to the frame body, the rollers having skewed axes, the rollers being in contact with each other, and at least one of the rollers being powered to macerate the hay therebetween by a rubbing action;

feeding the hay between the pair of rollers to form a mat; and spreading the hay, in the form of the mat, on the field.

* * * * *